United States Patent [19]

Morimura et al.

[11] Patent Number: 5,099,323
[45] Date of Patent: Mar. 24, 1992

[54] IMAGE FLUCTUATION STABILIZING APPARATUS FOR REDUCING FLUCTUATIONS IN IMAGE SIGNALS PICKED UP BY AN OPTICAL IMAGING DEVICE

[75] Inventors: Atsushi Morimura, Nara; Kenya Uomori, Katano; Hirofumi Ishii, Moriguchi, all of Japan

[73] Assignee: Matsushita Electric Industrial Co., Ltd., Osaka, Japan

[21] Appl. No.: 493,362

[22] Filed: Mar. 14, 1990

[30] Foreign Application Priority Data

Mar. 20, 1989 [JP] Japan ................................. 1-68206

[51] Int. Cl.[5] .............................................. H04N 7/18
[52] U.S. Cl. .................................. 358/105; 358/108; 358/222
[58] Field of Search .................. 358/105, 22, 108, 222

[56]  References Cited
U.S. PATENT DOCUMENTS

| 3,761,910 | 9/1973  | Vidovic ............................ 358/105 |
| 3,932,703 | 1/1976  | Bolsey ............................. 358/93  |
| 4,160,998 | 7/1979  | Kamin ............................. 358/105 |
| 4,178,612 | 12/1979 | Dudley ........................... 358/105 |
| 4,189,747 | 2/1980  | Funari ............................ 358/125 |
| 4,240,109 | 12/1980 | Michael .......................... 358/105 |
| 4,661,849 | 4/1987  | Hinman .......................... 358/105 |
| 4,694,329 | 9/1987  | Belmares-Sarabia ............. 358/105 |
| 4,777,530 | 10/1988 | Kondo ............................ 358/105 |

FOREIGN PATENT DOCUMENTS 61-107886  5/1986  Japan .
61-237581  10/1986  Japan .
61-269475  11/1986  Japan .

OTHER PUBLICATIONS

"Picture Center Correction" Japanese TV Society Technical Report, pp. 43–48, dated May 28, 1987.

Primary Examiner—John K. Peng
Assistant Examiner—Sherrie Hsia
Attorney, Agent, or Firm—Stevens, Davis, Miller & Mosher

[57] ABSTRACT

A fluctuation stabilizing apparatus is provided in which, in a process of integrating a motion vector to obtain an indication of the amount of image fluctuation, the integration characteristic is controlled in accordance with the magnitude of the integration result of the motion vector. A centering controller attenuates the output signal from the integrator in accordance with the magnitude of the output signal from the integrator. A memory interpolation controller shifts the position at which an image signal is read out of an image storing section which includes a memory for temporarily storing the imamge signal in accordance with the output signal of the integrator, so as to cancel the image fluctuation. The centering controller increases the rate of attenuation of the output signal from the integrator when such output signal corresponds to a value as large as one-half of a variable range of the shift of the read out position of the image signal from the image storing section.

2 Claims, 6 Drawing Sheets

IMAGE FLUCTUATION STABILIZING APPARATUS FOR REDUCING FLUCTUATIONS IN IMAGE SIGNALS PICKED UP BY AN OPTICAL IMAGING DEVICE

BACKGROUND OF THE INVENTION

The present invention relates to a signal processing apparatus for reducing the fluctuation of an image by the fluctuation of a video camera.

A conventional method of reducing the fluctuation of an image due to the fluctuation of a video camera is disclosed in JP-A-61-237581. FIG. 7 shows a block diagram for such a method. A signal from a video camera is converted into a digital signal and a motion vector is obtained on a frame image unit basis by using a frame memory and a correlator. An area to read out the image is determined by a stabilizing signal generator by using the motion vector. As a method of deciding the area, it is obtained from the difference between the movement amount of the image which was obtained by integrating the motion vector and a reference line which was obtained by smoothing the movement amount. The area is determined by using the above method, the image signal is read out of the frame memory, and the image corresponding to the area determined is output by a stabilizer, thereby reducing the fluctuation of the image.

However, the above method is equivalent to that in which the fluctuation of the image is reduced by the signal in which the low frequency components of the movement amount were eliminated by a simple HPF from the movement amount of the image which had been obtained by integrating the motion vector.

Therefore, in the case where the input image is slowly fluctuating at a low frequency, it is difficult to stabilize the fluctuation by the above fluctuation correcting method. Particularly, if the fluctuation frequency is low, the fluctuation signal obtained by passing through the HPF is set to zero, so that there is a problem such that the fluctuation is never stabilized. On the other hand, when the cut-off frequency of the HPF is set to a low frequency, there is a problem such that a large stabilization range is necessary. In consideration of the above problems, it is an object of the present invention to provide a fluctuation stabilizing apparatus in which even when the fluctuating frequency is low, the fluctuation is sufficiently stabilized and even when the stabilized range is physically narrow, an effective enough stabilization range is obtained.

SUMMARY OF THE INVENTION

According to the present invention, there is provided a fluctuation stabilizing apparatus comprising: a motion vector detector to obtain a motion vector corresponding to an input signal; an integrator to integrate the vector derived; a centering controller to convert the integrated value in accordance with a predetermined rule; and a memory interpolation controller to control a memory and an interpolator in accordance with an output of the integrator.

With the above construction, according to the present invention, even if the fluctuating frequency is low, when the integrated value of the motion vector is small, sufficient stabilization can be executed by the operation of the centering controller. On the other hand, when the fluctuation amplitude is large, an effectively sufficient stabilization range can be set.

DETAILED DESCRIPTION OF THE PREFERRED EMBODIMENTS

Figure 1A:
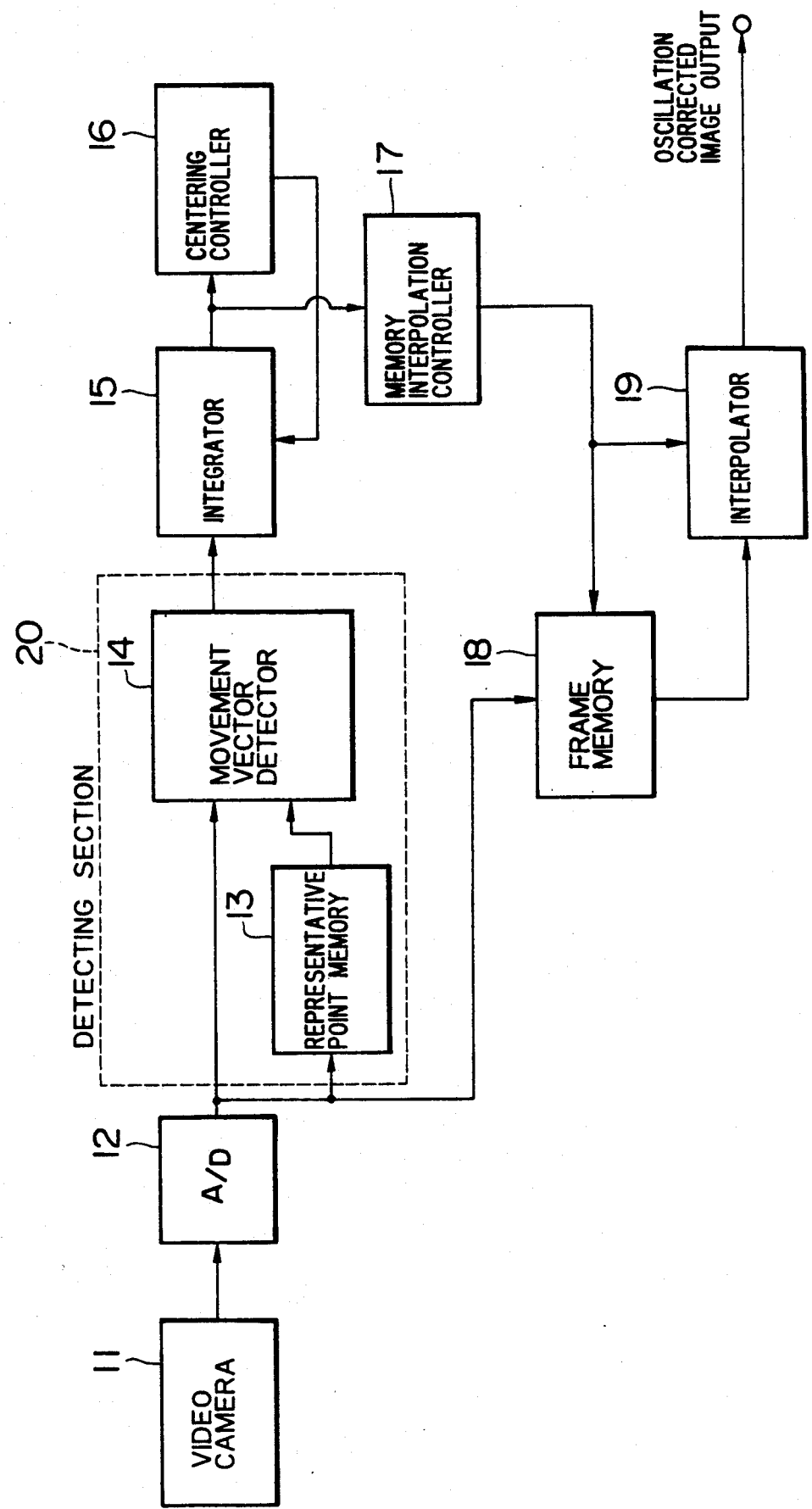
FIG. 1A is a block diagram of a fluctuation stabilizing apparatus of an embodiment according to the present invention.

FIG. 1A shows a block diagram of a fluctuation stabilizing apparatus in the first embodiment of the present invention. In FIG. 1A, reference numeral 11 denotes a video camera to output a video signal; 12 indicates an A/D converter to convert an analog signal into a digital signal; 13 a representative point memory to record the data of a predetermined point of the input signal; 14 a motion vector detector to detect a motion vector by the input signal and the signal in the representative point memory; 15 an integrator to integrate the detected motion vector; 16 a centering controller to convert the integrated value by an output value of the integrator; 17 a memory interpolation controller for controlling a frame memory 18 and an interpolator 19 by the output of the integrator and outputting a video signal in which the fluctuation was stabilized and 20 a detecting section to detect the motion of the image.

The operation of the fluctuation stabilizing apparatus of the embodiment constructed as discussed above will now be described hereinbelow.

Figure 2:
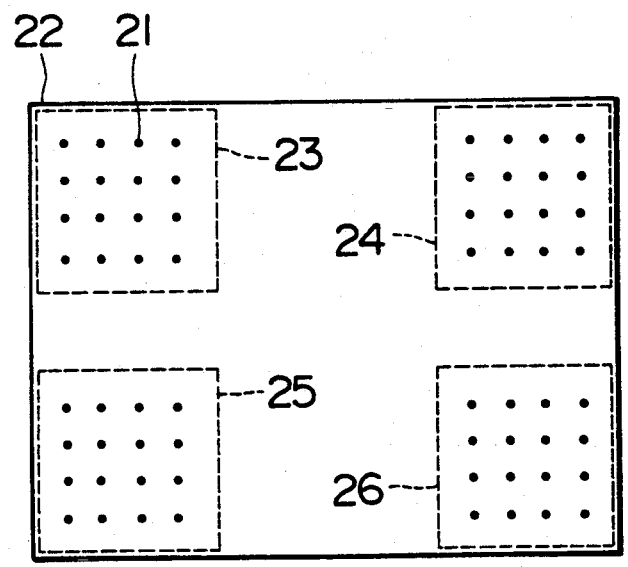
FIG. 2 is a diagram showing an area to obtain a motion vector in the embodiment and positions of representative points.

The A/D converter 12 converts the input video signal into a digital signal and inputs to the representative point memory 13, frame memory 18, and motion vector detector 14. FIG. 2 shows an example of representative points in the video signal. In the diagram, reference numeral 22 denotes a size of one field indicated by the video signal and 21 denotes points indicative of the positions of the representative points of the field. The video signal converted into the digital signal is recorded into the frame memory on a field unit basis. At the same time, the signals of the positions shown in FIG. 2 are recorded into the representative point memory. In the motion vector detector 14, a signal SP (x, y) which is precedent by one field and is obtained from the representative point memory and a signal IS (x+I, y+J) which is obtained from the A/D converter are calculated by a method shown by the following equation and (I, J) of the minimum value among M (I, J) is set as a motion vector. x, y, I, and J denote coordinates indicative of the positions in the lateral and vertical directions of one image. The detecting section 20 is constructed by the representative point memory 13 and motion vector detector 14 as described above.

$$M(I, J) = \sum_{x,y} IS(x + I, y + J) - SP(x, y)$$

As shown by reference numerals 23 to 26 in FIG. 2, since the representative points are divided into four areas, the motion vector is obtained every area. However, it is now assumed that the intermediate value of the four vectors obtained is set to the motion (fluctuation) of the video signal between fields.

Since the fluctuation obtained as described above relates to only one field, it is integrated by the integrator 15, thereby obtaining the continuous fluctuation. However, in the case of executing the simple integration, an output of the integrator 15 has a large value and exceeds a shifting range of the frame memory 18. Therefore, the integrated value is controlled by the centering controller 16.

Figure 1B:
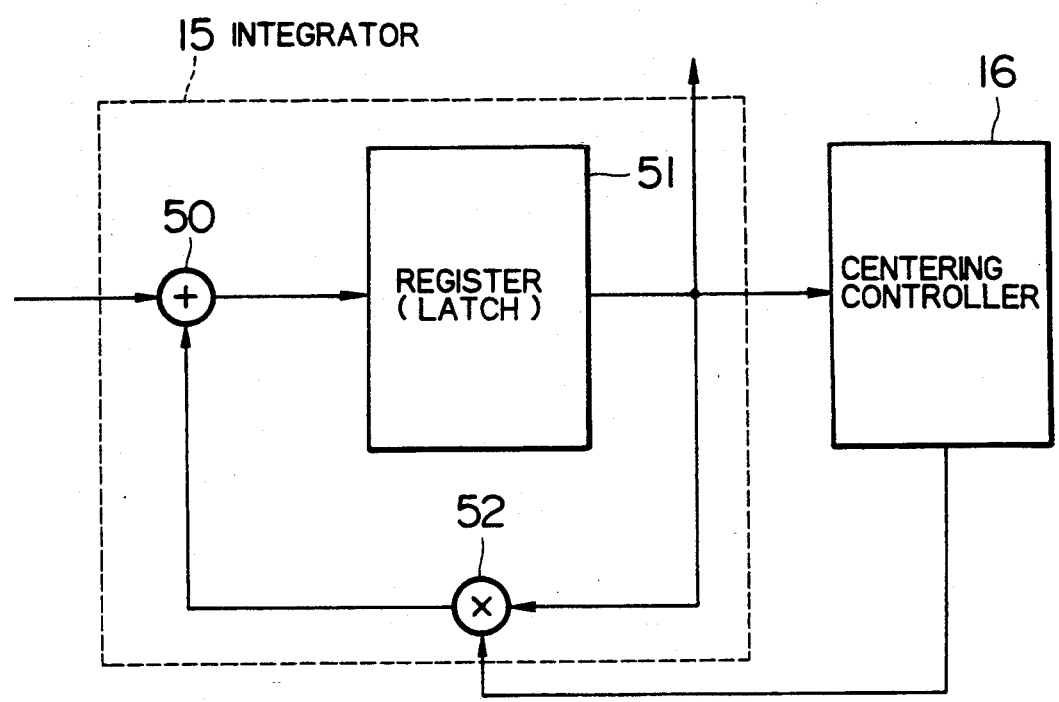
FIG. 1B is a diagram showing a construction of an integrator.

FIG. 1B shows a construction of the integrator 15. Reference numeral 50 denotes an adder; 51 a register comprising a latch; and 52 a multiplier. The result of the integration is stored into the register 51. The motion vector in one field which was obtained is input to the adder 50 and is added to the value in which the result of the integration stored in the register 51 was multiplied with an attenuation constant (0–1), thereby obtaining the result of the next integration. The attenuation constant is obtained by the centering control, which will be explained hereinbelow.

The image recorded in the frame memory 18 is shifted in the lateral and vertical directions in accordance with the fluctuation obtained mentioned above, thereby stabilizing so as to eliminate the fluctuation components. A distance to shift is called a shift amount of the image hereinbelow.

Figure 3:
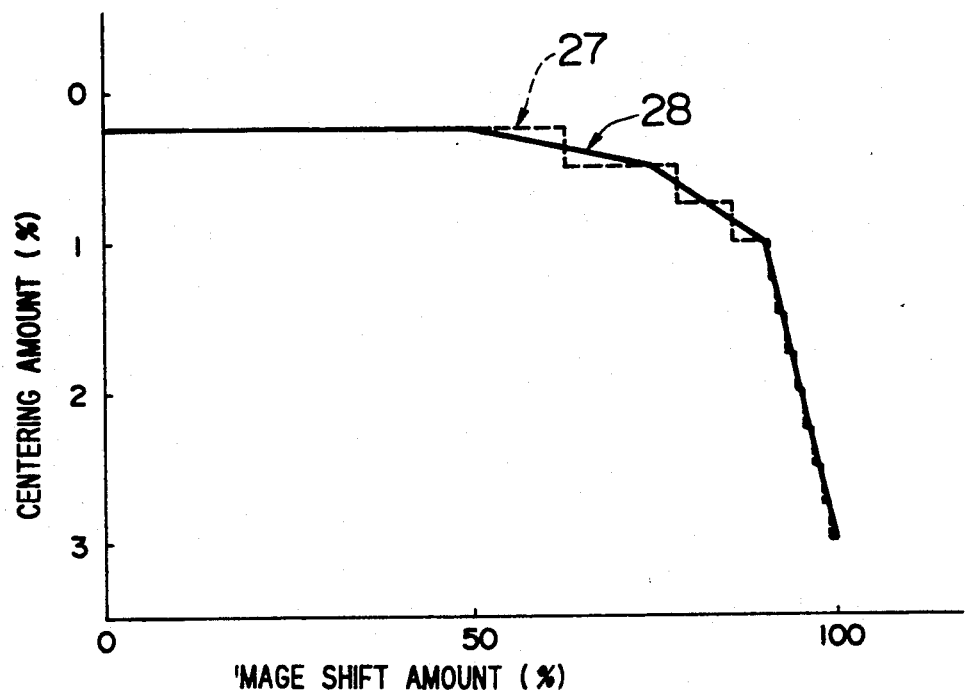
FIG. 3 is a diagram showing an example of centering characteristics.
Figure 4:
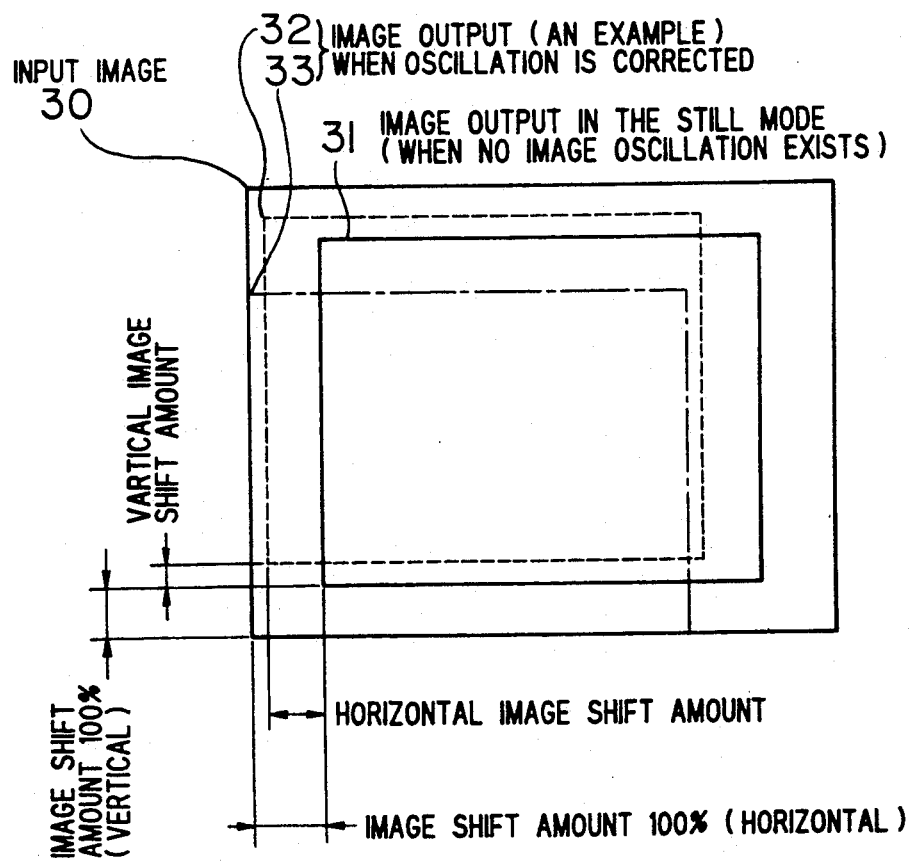
FIG. 4 is a diagram showing an image shift amount.

FIG. 3 shows an example of the control of the centering control 16. In the diagram, an axis of abscissa indicates a shift amount of the image. The shift amount corresponds to the range where the image can be shifted in the lateral and vertical directions in the frame memory 18. Such a range is shown in FIG. 4. In the diagram, reference numeral 30 denotes a size of the whole image which is input and 31 indicates an output range of the image in the case where an image shift amount is set to 0%. The state of the image shift amount of 0% corresponds to that the central portion of the input image is output. Reference numeral 33 shows an example of a state in which the image shift amount is set to 100%. The state of the image shift amount of 100% corresponds to the case of outputting one of four corner portions of the input image. A centering amount of an axis of ordinate shown in FIG. 3 is a value indicative of an extent of attenuation of the integrated value (output of the integrator 15) which is performed in one field. When the centering amount is set to 1%, the integrated value is attenuated one percent by every one field, so that the integrated value is attenuated to almost 55% for one second.

The centering amount corresponds to the attenuation constant of the integrator 15. When the centering amount is set to 1%, the attenuation constant is set to 99% and the relationship between them is obtained as follows.

Centering amount (%) + attenuation constant (%) = 100

When the centering amount increases, the attenuation constant decreases from 100%. With the construction of the integrator shown in FIG. 1b, when the centering amount is not set to 0, the result of the integration indicative of the shift amount of the image gradually decreases. When the image does not fluctuate, the image shift amount is finally set to 0 and the central portion of the input image is output.

When the centering amount is small, there are obtained characteristics in which the accurate stabilization can be performed until low frequency components. On the other hand, when the centering amount is large, there are obtained characteristics such that the stabilization range is widened. The control is performed by variably changing the centering amount in accordance with the image shift amount. In the example of FIG. 3, the centering amount is set to a constant value of 0.25% until the image shift amount of 50%. When the image shift amount is equal to or larger than 50%, the centering amount gradually decreases. When the image shift amount is set to 100%, the centering amount is increased up to 3%.

By controlling as described above, in a range of a small image shift amount (in the case where the fluctuation is small and is concentrated to an almost central portion), the centering amount is set to a sufficiently small value, thereby accurately stabilizing even the fluctuation including low frequency components. On the other hand, when the image shift amount is large (in the case where the fluctuation amount is large and the fluctuating point is deviated from the center), the centering amount is increased, thereby assuring a wide enough stabilization range.

As described above, according to the first embodiment, by controlling the characteristics of the integrator by the centering controller, even in a physically small stabilization range, accurate stabilization for a small fluctuation including low frequency components and stabilization having a sufficiently wide stabilization range for large fluctuation can be realized in accordance with the conditions.

Figure 5:
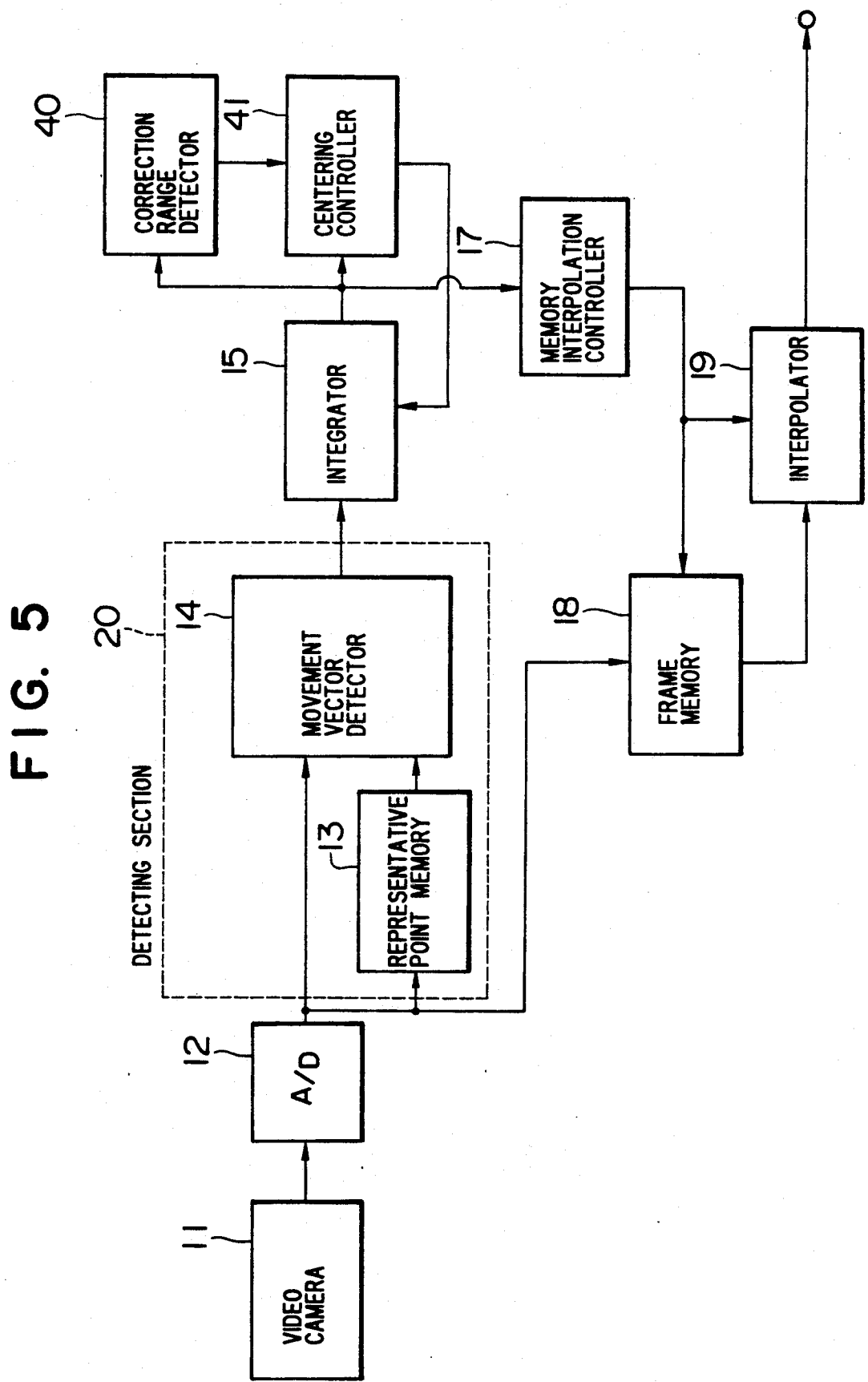
FIG. 5 is a block diagram of a fluctuation stabilizing apparatus of another embodiment of the present invention.

FIG. 5 is a block diagram of a fluctuation stabilizing apparatus showing the second embodiment of the invention. In the diagram, reference numeral 11 denotes the video camera to output a video signal; 12 indicates the A/D converter to convert an analog signal into a digital signal; 13 the representative point memory to record the data of predetermined points of the input signal; 14 the motion vector detector to detect a motion vector by the input signal and the signal in the representative point memory; 15 the integrator to integrate the detected motion vector; and 17 the memory interpolation controller for controlling the frame memory 18 and the interpolator 19 by an output of the integrator and for outputting the video signal in which the fluctuation was stabilized. The above construction is the same as that in FIG. 1. The construction of the second embodiment differs from the construction of FIG. 1 with respect to a point that a stabilization range detector 40 is provided and the characteristics of a centering controller 41 are controlled in accordance with the output of the integrator 15.

Figure 6A:
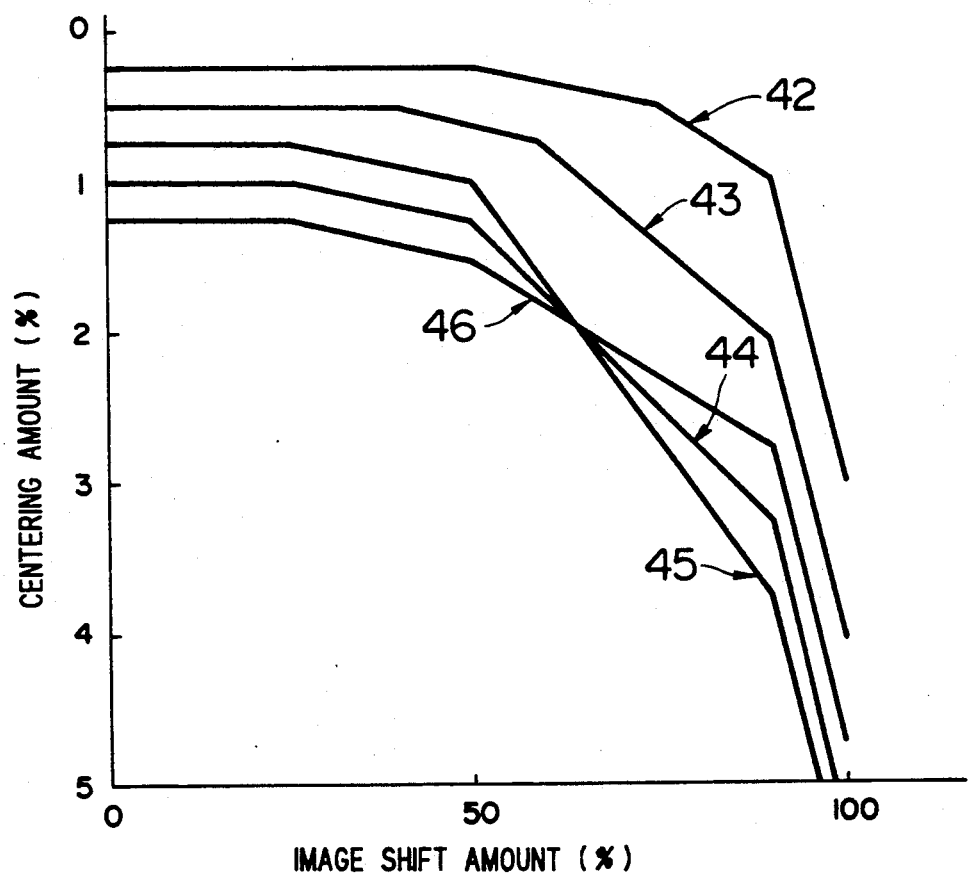
FIG. 6A is a diagram showing another example of centering characteristics.

The operation of the fluctuation stabilizing apparatus in the second embodiment constructed as discussed above will now be described hereinbelow. Since the operations until the motion vector is integrated and the control of the frame memory are the same as those in the first embodiment, their descriptions are omitted. The integrated amount (image shift amount) obtained by the integrator 15 is input to the centering controller 41 and the stabilization range detector 40. The detector 40 calculates a time average of the image shift amounts, thereby discriminating whether the fluctuation of the input image signal is large or small. When the time average of the image shift amounts is large, the fluctuation is determined to be large. When the time average of the image shift amount is small, the fluctuation is decided to be small. The characteristics of the centering controller 41 are controlled by the fluctuation amount derived by the stabilization range detector 40. The centering controller 41 controls on the basis of the fluctuation amount and is also controlled by the image shift amount of the integrator 15 which is input in a manner similar to the first embodiment. FIG. 6A shows control characteristics of the centering controller 41. In the diagram, an axis of ordinate indicates a centering amount and an axis of abscissa denotes an image shift amount. Reference numeral 42 shows characteristics when the fluctuation amount is small, 43 indicates characteristics when the fluctuation amount is set to an almost medium value, and 44 shows characteristics when the fluctuation amount is large. When the fluctuation increases, the centering amount is set to a large value even in the region of a small image shift amount. On the contrary, in a range of a large image shift amount, the centering amount is further increased, thereby coping with the state of a large fluctuation amount. By controlling the characteristics of the centering controller 41 as discussed above, the fluctuation can be also stabilized with a sufficient wide stabilization range even for a large fluctuation which cannot be stabilized by only the control of the centering amount due to a change in image shift amount. FIG. 6A shows merely one example of the characteristics. In the case of paying an importance to the stabilization of low frequency components of the stabilization of a range of a small image shift amount, as characteristics shown by 45, the centering amount of the range of a small image shift amount is set to a small value; on the contrary, in a range of a large image shift amount, the centering amount can be also further increased. On the other hand, in the case where importance is placed on the stabilization in a range of a large image shift amount, as characteristics shown by 46, the centering amount is increased from the range of a small image shift amount and even in the range of a large image shift amount, the centering amount is not suddenly increased. As discussed above, even in a large fluctuation region, the necessary characteristics can be realized.

Further, there is the following relation in the centering amounts. Assuming that a vector which was integrated by the integrator 15 is set to sv, a vector which is input to the integrator is set to v, an attenuation constant is set to K, and a centering amount is set to A, the following relation is obtained.

$$sv(n+1) = K\{sv(n)\} \cdot sv(n) + v(n)$$

where $$K\{sv(n)\} = 1 - A\{sv(n)\}$$

The following equation is obtained by modifying and differentiating the above relations.

$$d(d(sv(n))) = - \underline{\{d(A\{sv(n)\}) \cdot sv(n)/d(sv(n)) +}$$

-continued $$\underline{A\{sv(n)\}\}} \cdot d(sv(n))$$

The underlined portion in the above equation denotes the range of 1 to 0 and the integrated vector sv is converged without a vibration. By solving the above relation by $K = K_{min}$ under the initial conditions of $sv = sv_{max}$, the following relations are obtained.

$$K(sv) < sv_{max} \cdot K_{min}/sv$$

$$K(sv) > -sv_{max}/sv \cdot (1 - K_{min}) + 1$$

Figure 6B:
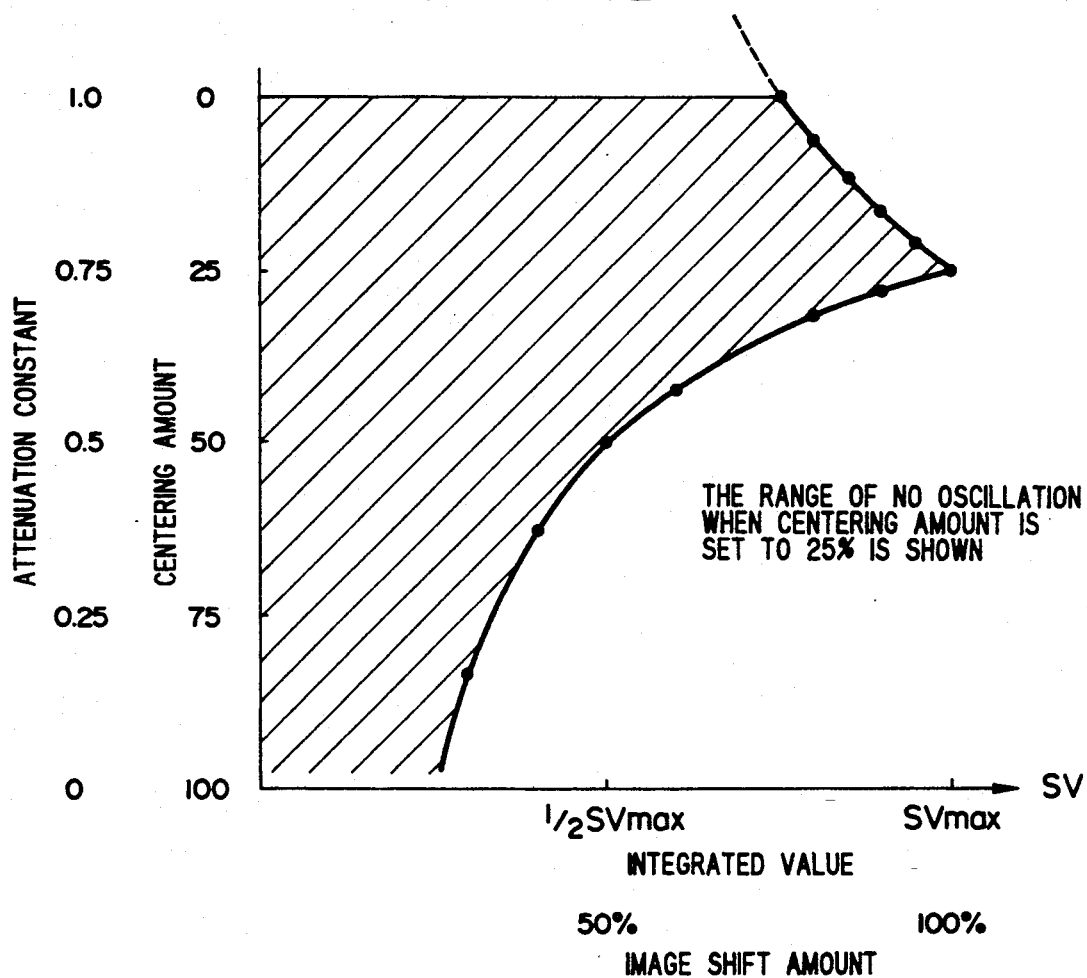
FIG. 6B is a diagram showing a limit of the centering characteristics.
Figure 7:
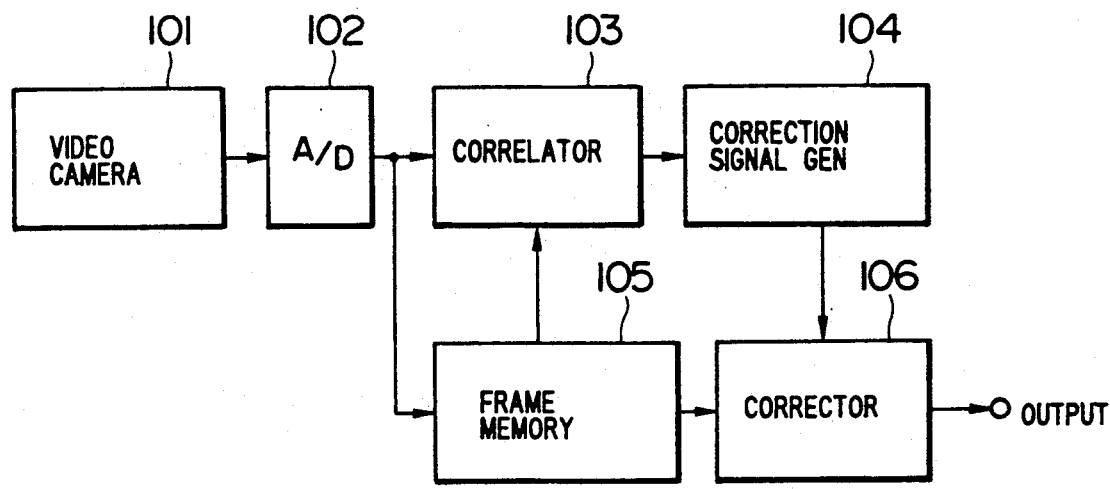
FIG. 7 is a block diagram of a conventional fluctuation stabilizing apparatus.

FIG. 6b shows those relationships. The range shown by a hatched region corresponds to the condition having no vibration. The characteristics of FIG. 6A are also set so as to satisfy the above condition.

As discussed above, according to the second embodiment, by providing the stabilization range detector and controlling the centering amount in accordance with the fluctuation amount and image shift amount, even in the case of a very large fluctuation, the fluctuation can be stabilized with a sufficiently wide stabilizing range.

In the first embodiment, the relationship between the image shift amount and the centering amount is shown by 28 in FIG. 3. However, the invention is not limited to such characteristics. For instance, even in the case of using approximate characteristics as shown by 27, there is not so large difference in the performance of the whole fluctuation stabilization. If the characteristics such that the centering amount increases as the image shift amount increases are used, the object of the present invention can be accomplished. On the other hand, with respect to the above characteristics, the same shall also apply to the second embodiment. There is no need to limit to the characteristics of FIG. 6A.

In the second embodiment, the characteristics of the stabilization range detector are set by calculating the average value of the image shift amounts. However, it is also possible to use the characteristics in which the peak value is obtained or the intermediate characteristics can be also used. There is no need to limit to the characteristics in which the average value is calculated.

In the embodiment of the invention, a method of obtaining the image fluctuation by using the signal processes has been shown. However, the invention is not limited to such a method. In the case of providing the apparatus in the video camera, the fluctuation can be also obviously detected by a sensor.

According to the present invention, each function can be obviously realized by a software by using a microcomputer.

As described above, according to the invention, even in the case of a low fluctuating frequency, if the integrated value of the motion vector is small, sufficient stabilization can be executed by the operation of the centering controller. On the other hand, in the case of a large fluctuation amplitude, an effectively wide stabilization range can be set. The practical effect of the invention is large.

We claim:
1. A fluctuation stabilizing apparatus, comprising:
a detecting means for providing an output signal representing a shift of an image in each field or frame of an input image signal, said shift of said image representing a difference fluctuation be- tween picked-up images caused by a fluctuation of a video camera during a pickup operation;

an integrator for obtaining an output signal representing a fluctuation of the image signal by integrating the output from the detecting means representing the shift of the image;

a centering controller for attenuating the output signal from the integrator in accordance with a magnitude of the output signal from the integrator; and a memory interpolation controller for shifting a position at which an image signal is read out of an image storing section including a memory for temporarily storing the image signal in accordance with the output signal of the integrator thereby to cancel the fluctuation of the image, wherein the centering controller increases a rate of attenuation of the output signal from the integrator when the output signal from the integrator corresponds to a value as large as ½ of a variable range of the shift of the readout position of the image signal from the image storing section.

2. An apparatus according to claim 1, further comprising a correction range detector for providing a signal representing an average fluctuation of the image signal by smoothing the output signal of the integrator and for controlling the centering controller when the signal representing the average fluctuation indicates an average value thereof as large as ½ of the variable range of the shift of the readout position of the image signal from the image storing section thereby to further increase the rate of attenuation of the output signal from the integrator.

* * * * *